US009986104B2

(12) United States Patent
Nanjundan et al.

(10) Patent No.: US 9,986,104 B2
(45) Date of Patent: May 29, 2018

(54) ROUTING OF DIAMETER PROTOCOL MESSAGES BASED ON A SUBSCRIBER POLICY

(71) Applicant: Verizon Patent and Licensing Inc., Arlington, VA (US)

(72) Inventors: Vijay Nanjundan, Piscataway Township, NJ (US); Arvind Aggarwal, San Ramon, CA (US); Earlin George, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 108 days.

(21) Appl. No.: 15/251,733

(22) Filed: Aug. 30, 2016

(65) Prior Publication Data

US 2018/0063334 A1 Mar. 1, 2018

(51) Int. Cl.
*H04M 11/00* (2006.01)
*H04M 15/00* (2006.01)
*H04W 4/24* (2018.01)
*H04W 4/00* (2018.01)

(52) U.S. Cl.
CPC ........... *H04M 15/67* (2013.01); *H04M 15/00* (2013.01); *H04W 4/00* (2013.01); *H04W 4/24* (2013.01); *H04M 15/41* (2013.01); *H04M 15/60* (2013.01)

(58) Field of Classification Search
CPC .. H04M 15/00; H04M 15/57; H04M 2215/32; H04M 17/00; H04M 2215/204; H04M 15/41; H04M 15/43; H04M 15/66; H04M 15/765; H04M 2215/2026; H04M 15/77; H04M 2215/28; H04M 2215/7254; H04M 15/68; H04W 4/24; H04W 4/14; H04W 4/12; H04W 4/185; H04W 80/10; H04W 4/00
USPC ....... 455/406, 466, 405, 414.1, 411; 705/34, 705/30, 400, 26.1
See application file for complete search history.

(56) References Cited

U.S. PATENT DOCUMENTS

2014/0302813 A1* 10/2014 Luo ..................... H04L 65/1063
455/406
2016/0349351 A1* 12/2016 Ludden ................. G01S 5/0027
2016/0373591 A1* 12/2016 Sharma ............... H04L 12/1407

OTHER PUBLICATIONS

Barton, "Offline Charging System (OFCS)—introduction to Gx interface," http://www.lteandbeyond.com/2012/01/offline-charging-system-ofcs.html, Jan. 13, 2012, 5 pages.

(Continued)

*Primary Examiner* — Fred Casca

(57) ABSTRACT

A device may determine a subscriber identifier associated with a subscriber device. The device may obtain a service indicator based on the subscriber identifier. The service indicator may identify a network service to which a subscriber, associated with the subscriber identifier, is subscribed. The device may obtain a charging data function (CDF) identifier based on the service indicator. The CDF identifier may identify a destination CDF for charging messages associated with the network service. The device may establish a communication session associated with the subscriber device and the network service. The device may transmit one or more charging messages, associated with the communication session, to the destination CDF identified by the CDF identifier.

20 Claims, 4 Drawing Sheets

(56) References Cited

OTHER PUBLICATIONS

Barton, "Online Charging System (OCS)—introduction to Gy interface," http://www.lteandbeyond.com/2012/01/online-charging-system-ocs-how-gy.html, Jan. 11, 2012, 11 pages.

3GPP, "Digital cellular telecommunications system (Phase 2+); Universal Mobile Telecommunications System (UMTS); LTE; Telecommunication management; Charging management; Charging architecture and principles," 3GPP TS 32.240 version 13.1.0 Release 13, http://www.etsi.org/deliver/etsi_ts/132299/132240/13.01.00_60/ts_132240v130100p.pdf, May 2016, 58 pages.

* cited by examiner

ROUTING OF DIAMETER PROTOCOL MESSAGES BASED ON A SUBSCRIBER POLICY

BACKGROUND

Service providers in the telecommunication industry offer a variety of different network service plans to their customers, each of which may contain unique requirements. To manage these requirements, service providers often monitor network resource usage associated with each consumer and each network service plan.

DETAILED DESCRIPTION OF PREFERRED EMBODIMENTS

The following detailed description of example implementations refers to the accompanying drawings. The same reference numbers in different drawings may identify the same or similar elements.

In the telecommunications industry, service providers may track customer data use and manage account information by utilizing online charging systems and/or offline charging systems. During the offline charging process, where customers pay for data usage periodically (e.g., monthly), service providers may use charging trigger functions (CTFs) to generate charge events based on network resource usage (e.g., data usage, use of a network service, etc.). These charge events are transmitted to charging data functions (CDFs) (e.g., hosted on servers or other types of devices), which create records that explain customer transaction information.

To implement the offline charging process, a routing device may use a transfer protocol, such as the Diameter protocol, to send the charge information to a group of CDFs (e.g., via Diameter Rf messages, where Rf represents the offline charging reference point between a network element and the CDF). As a result, charge information for a subscriber (e.g., a user that has subscribed to one or more network services) may be sent to the same group of CDFs regardless of the transaction arrangement between the subscriber and the service provider for a particular network service. This may create difficulties in accurately charging subscribers for network service use when different subscribers have different transaction arrangements. Implementations described herein allow a packet data network (PDN) gateway (PGW) to transmit charging messages to different CDF groups based on subscriber profile information and a set of rules associated with the charge information. This allows charge information for specific network services and/or specific subscribers to be routed to specific destination CDFs. In this way, implementations described herein allow for intelligent routing that provides faster and more efficient implementations of new network services, greater flexibility in creating network services, more accurate transaction, and conservation of computing resources due to automatic routing of the charge information to the appropriate destination.

Figure 1:
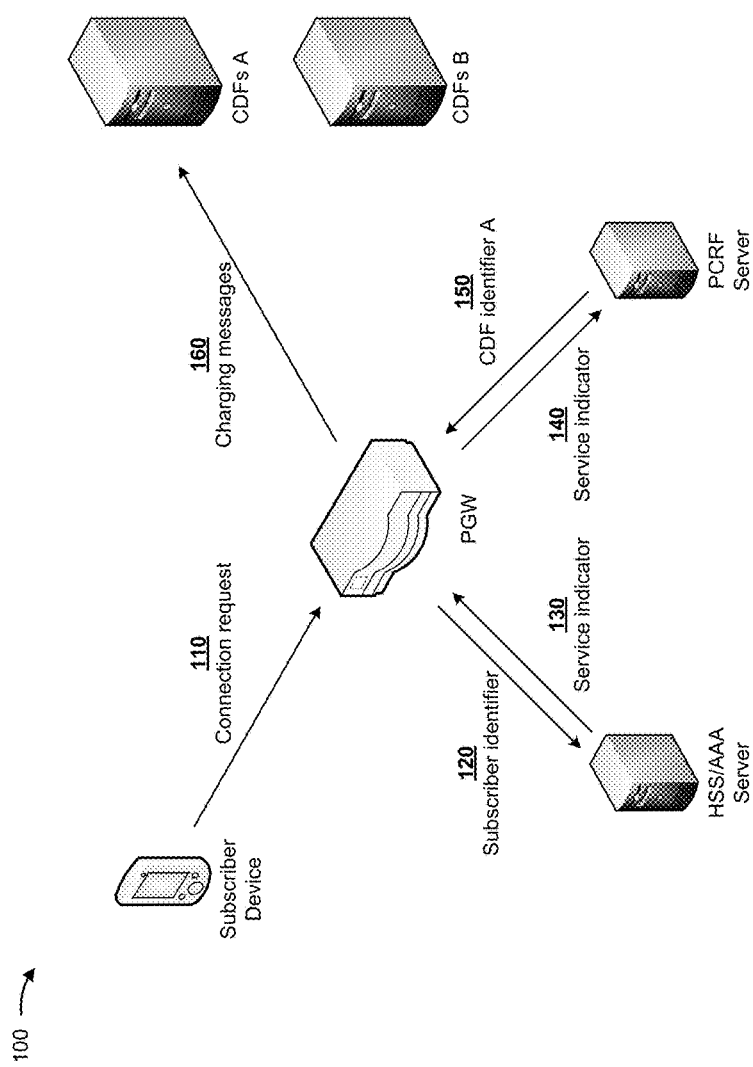
FIG. 1 is a diagram of an overview of an example implementation described herein.

FIG. 1 is a diagram of an overview of an example implementation 100 described herein. As shown in FIG. 1, and by reference number 110, a PGW may receive a connection request from a subscriber device. For example, the PGW may receive a connection request that includes a subscriber identifier associated with the subscriber device. In some implementations, the subscriber identifier may be a unique identifier associated with a subscriber and/or subscriber device.

As further shown in FIG. 1, and by reference number 120, the PGW may transmit the subscriber identifier to a home subscriber server/authentication, authorization, and accounting (HSS/AAA) server. For example, the PGW may transmit the subscriber identifier to the HSS/AAA server to obtain subscriber policy information. The subscriber policy information may include information relating to the subscriber identifier, such as a service indicator for one or more subscribed network services associated with the subscriber identifier, and/or charge information associated with the one or more network services. As shown by reference number 130, the PGW may receive the service indicator from the HSS/AAA server. The service indicator may indicate to the PGW which network service(s) the subscriber device is permitted to access. The PGW may use the service indicator to obtain routing information and/or charge information for the network service(s).

As further shown in FIG. 1, and by reference number 140, the PGW may transmit the service indicator to a PCRF server. For example, the PGW may transmit the service indicator to the PCRF server to receive a set of rules associated with the network service(s) (e.g., destination rules, charging rules, etc.). The set of rules may indicate, for example, one or more CDFs (e.g., a CDF group) to which charging messages associated with the subscriber and the network service(s) are to be routed. As shown by reference number 150, the PGW may receive a CDF identifier (e.g., CDF identifier A) from the PCRF server. In some implementations, the PGW may receive a CDF identifier, associated with a CDF group, to determine a destination for routing charging messages (e.g., Diameter Rf messages) associated with the subscriber and a network service. For example, CDF identifier A may be associated with CDF group A, which may indicate to the PGW that CDF group A is the proper destination for routing the charging messages. In addition to receiving the CDF identifier, the PGW may also receive charging rules associated with the service indicator. For example, the charging rules may indicate a limit for data use, a limit for voice and/or video calls, a bandwidth subscription amount, or the like.

As further shown in FIG. 1, and by reference number 160, the PGW may transmit charging messages to a CDF group identified by the CDF identifier received from the PCRF server (e.g., CDF group A). In some implementations, the PGW may transmit a charging message to the CDF group (e.g., to CDF group A) that includes charging information for a particular subscriber (e.g., identified by the subscriber identifier) using a particular network service (e.g., identified by the service indicator, such as service A). In this case, a second CDF group (e.g., CDF group B) may receive charging messages for other network services (e.g., the second CDF group may be a default CDF destination for services other than service A). As a result, the PGW is able to differentiate between charging messages associated with a particular subscriber and/or network service and charging messages associated with other subscribers and/or network services.

The intelligent routing provided by the PGW allows for faster and more efficient implementation of new network services, faster and more efficient handling of subscriptions to existing network services, and greater flexibility in creating or modifying network services. For example, when a user subscribes to a network service, the HSS/AAA and/or the PCRF may be automatically provisioned with information regarding an arrangement that the user has with the service provider for using that network service, and the PGW may communicate with these devices to ensure proper routing of charging messages. These efficiencies reduce errors and conserve network resources that would otherwise be wasted if the PGW were to route charging messages to an incorrect destination. Furthermore, this increases transaction accuracy by eliminating situations where a subscriber is improperly credited due to having a subscription routed to the incorrect destination.

As indicated above, FIG. 1 is provided merely as an example. Other examples are possible and may differ from what was described with regard to FIG. 1.

Figure 2:
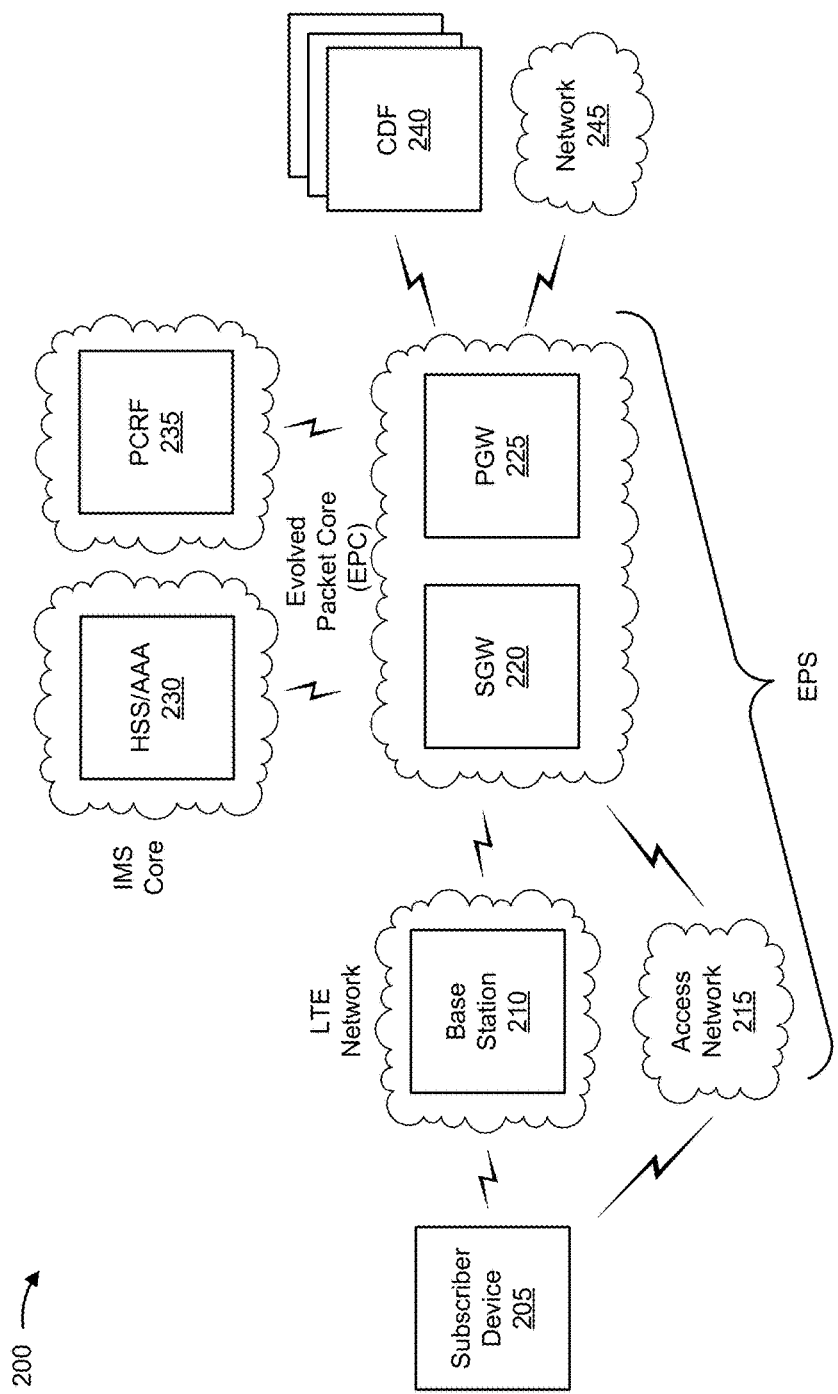
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a subscriber device 205, a base station 210, an access network 215, a serving gateway (SGW) 220, a PGW 225, a home subscriber server/authentication, authorization, and accounting server (HSS/AAA) 230, a policy and charging rules function (PCRF) 235, one or more charging data functions (CDFs) 240, and a network 245. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which subscriber device 205 communicates with the EPC. The EPC may include SGW 220 and/or PGW 225 that enable subscriber device 205 to communicate with network 245 and/or an internet protocol (IP) multimedia subsystem (IMS) core. The IMS core may include HSS/AAA 230, and may manage device registration and authentication, session initiation, etc., associated with subscriber device 205. HSS/AAA 230 may reside in the EPC and/or the IMS core.

Subscriber device 205 includes one or more devices capable of communicating with base station 210 and/or a network (e.g., access network 215, network 245, etc.). For example, subscriber device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. Subscriber device 205 may send traffic to and/or receive traffic from network 245 (e.g., via base station 210, SGW 220, and/or PGW 225). In some implementations, subscriber device 205 may transmit a network connection request to PGW 225 to establish a connection for a network service (e.g., for a subscriber associated with subscriber device 205).

Base station 210 includes one or more devices capable of transferring traffic, such as audio, video, text, and/or other traffic, destined for and/or received from subscriber device 205. In some implementations, base station 210 may include an eNB associated with the LTE network that receives traffic from and/or sends traffic to network 245 via SGW 220 and/or PGW 225. Additionally, or alternatively, one or more base stations 210 may be associated with a RAN that is not associated with the LTE network. Base station 210 may send traffic to and/or receive traffic from subscriber device 205 via an air interface. In some implementations, base station 210 may include a small cell base station, such as a base station of a microcell, a picocell, and/or a femtocell.

Access network 215 includes one or more wired and/or wireless networks. For example, access network 215 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks. In some implementations, access network 215 may allow subscriber device 205 to access one or more services provided by the EPC and/or network 245.

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 245 (e.g., via PGW 225) and/or other network devices associated with the EPC and/or the IMS core. SGW 220 may also receive traffic from network 245 and/or other network devices, and may send the received traffic to subscriber device 205 via base station 210. Additionally, or alternatively, SGW 220 may perform operations associated with handing off subscriber device 205 to and/or from an LTE network.

PGW 225 includes one or more devices capable of providing connectivity for subscriber device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 245. Additionally, or alternatively, PGW 225 may receive traffic from network 245, and may send the traffic to subscriber device 205 via SGW 220 and base station 210. PGW 225 may record data usage information (e.g., byte usage), and may provide the data usage information to HSS/AAA 230. In some implementations, PGW 225 may communicate with HSS/AAA 230 over a 3GPP S6b diameter interface (e.g., to receive subscriber profile information). Additionally, or alternatively, PGW 225 communicate with PCRF 235 over a Gx interface (e.g., to receive policy rules). Additionally, or alternatively, PGW 225 may communicate with CDF(s) 240 over an Rf interface (e.g., to transmit charging messages, such as Diameter Rf messages).

HSS/AAA 230 includes one or more devices, such as one or more server devices, capable of managing (e.g., receiving, generating, storing, processing, and/or providing) information associated with subscriber device 205. For example, HSS/AAA 230 may manage subscription information associated with subscriber device 205, such as information that identifies a profile of a subscriber associated with subscriber device 205, information that identifies network services and/or applications that are accessible to subscriber device 205, location information associated with subscriber device 205, a network identifier (e.g., a network address) that identifies subscriber device 205, information that identifies a treatment of subscriber device 205 (e.g., quality of service information, a quantity of minutes allowed per time period, a quantity of data consumption allowed per time period, etc.), information that identifies whether subscriber device 205 is associated with a radio frequency access signaling usage control policy and/or a radio frequency access signaling usage transaction policy, or the like. HSS/AAA 230 may provide this information to one or more other devices of environment 200 to support the operations performed by those devices. In some implementations, HSS/AAA 230 may receive a subscriber identifier from PGW 225 over a 3GPP S6b diameter interface, and may use the subscriber identifier to identify and transmit a service indicator to PGW 225 over the 3GPP S6b diameter interface.

Additionally, or alternatively, HSS/AAA 230 may perform authentication operations for a subscriber associated with subscriber device 205 (e.g., using one or more credentials), may control access, by subscriber device 205, to a service and/or an application (e.g., based on one or more restrictions, such as time-of-day restrictions, location restrictions, single or multiple access restrictions, read/write restrictions, etc.), may track resources consumed by subscriber device 205 (e.g., a quantity of voice minutes consumed, a quantity of data consumed, a quantity of radio frequency signals transmitted, a quantity of radio access bearers requested and/or established, etc.), and/or may perform similar operations.

PCRF 235 includes one or more network devices or other types of communication devices. PCRF 235 may store subscriber information, such as voice call and data rate plans or quotas for subscribers. PCRF 235 may provide network control regarding service data flow detection, gating, Quality of Service (QoS), and/or flow-based charging. Policies and rules regarding QoS may include policies and rules instructing subscriber device 205 and/or network elements (base station 210, SGW 220, PGW 225, etc.) to minimize packet loss, to implement a packet delay budget, to provide a guaranteed bit rate (GBR), to provide a particular latency, to reduce RF signal congestion, and/or to perform other activities associated with QoS. PCRF 235 may provide policies and rules to other network devices, such as base station 210, SGW 220, PGW 225, or the like, to implement network control. PCRF 235 may determine how a certain service data flow shall be treated, and may ensure that subscriber plane traffic mapping and QoS is in accordance with a subscriber's profile and/or network policies. In some implementations, PCRF 235 may receive a service indicator from PGW 225 over a Gx interface, and use the service indicator to identify and transmit charging information and/or a CDF identifier to PGW 225 over the Gx interface.

CDF 240 includes one or more devices capable of transmitting, receiving, and/or storing charging messages. For example, CDF 240 may include a computing device, such as server, a group of servers, a desktop computer, a laptop computer, or the like. In some implementations, CDF 240 may receive charging messages (e.g., Diameter Rf messages) from PGW 225 over an Rf interface. Additionally, or alternatively, charging messages may pass through one or more charging trigger functions (CTFs) during this transmission (e.g., over the Rf interface). In some implementations, CDF 240 may include multiple CDF groups (e.g., a group of one or more CDF servers), such as a first CDF group, a second CDF group, etc.

Network 245 includes one or more wired and/or wireless networks. For example, network 245 may include a cellular network (e.g., an LTE network, a 3G network, a code division multiple access (CDMA) network, a 5G network, or another advanced generation network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
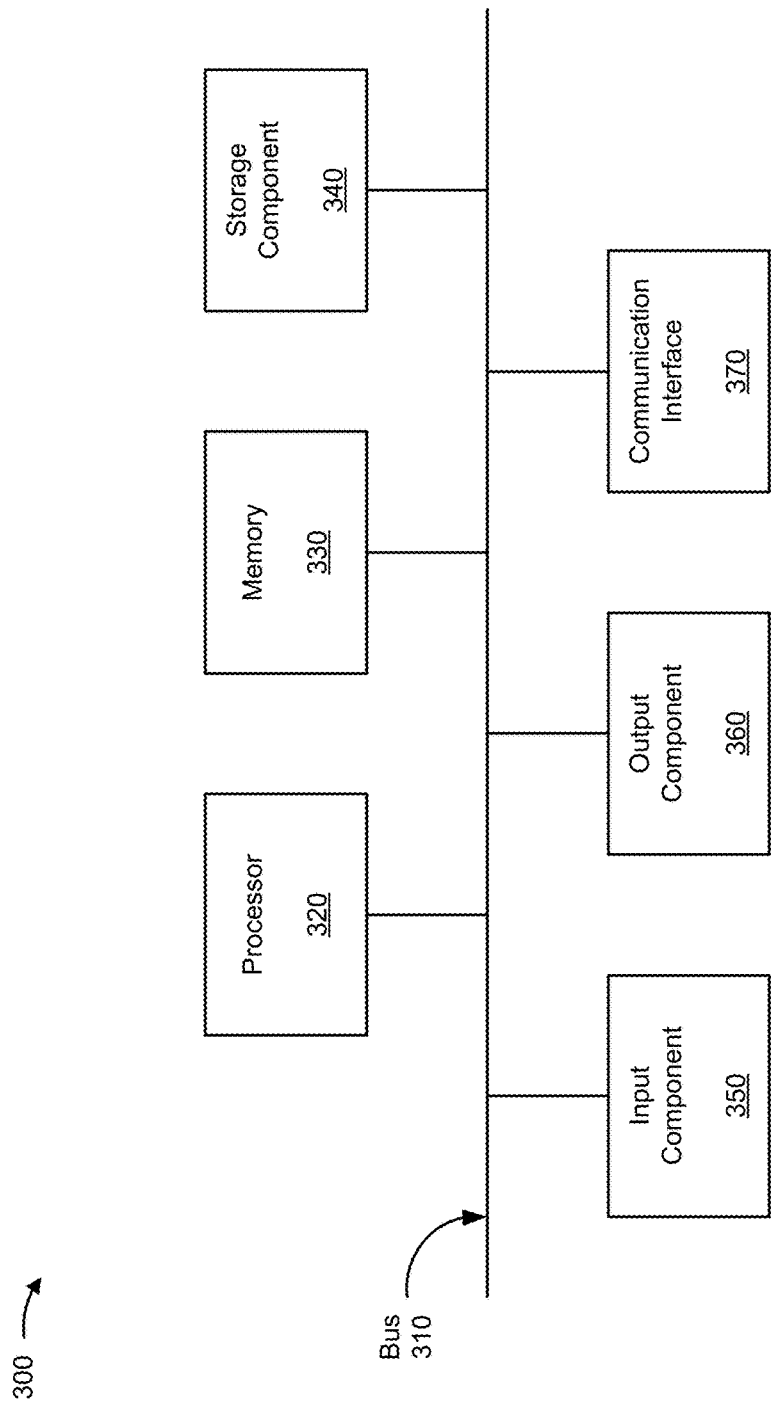
FIG. 3 is a diagram of example components of one or more devices of FIG. 2.

FIG. 3 is a diagram of example components of a device 300. Device 300 may correspond to subscriber device 205, base station 210, SGW 220, PGW 225, HSS/AAA 230, PCRF 235, and/or CDF 240. In some implementations, subscriber device 205, base station 210, SGW 220, PGW 225, HSS/AAA 230, PCRF 235, and/or CDF 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via subscriber input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
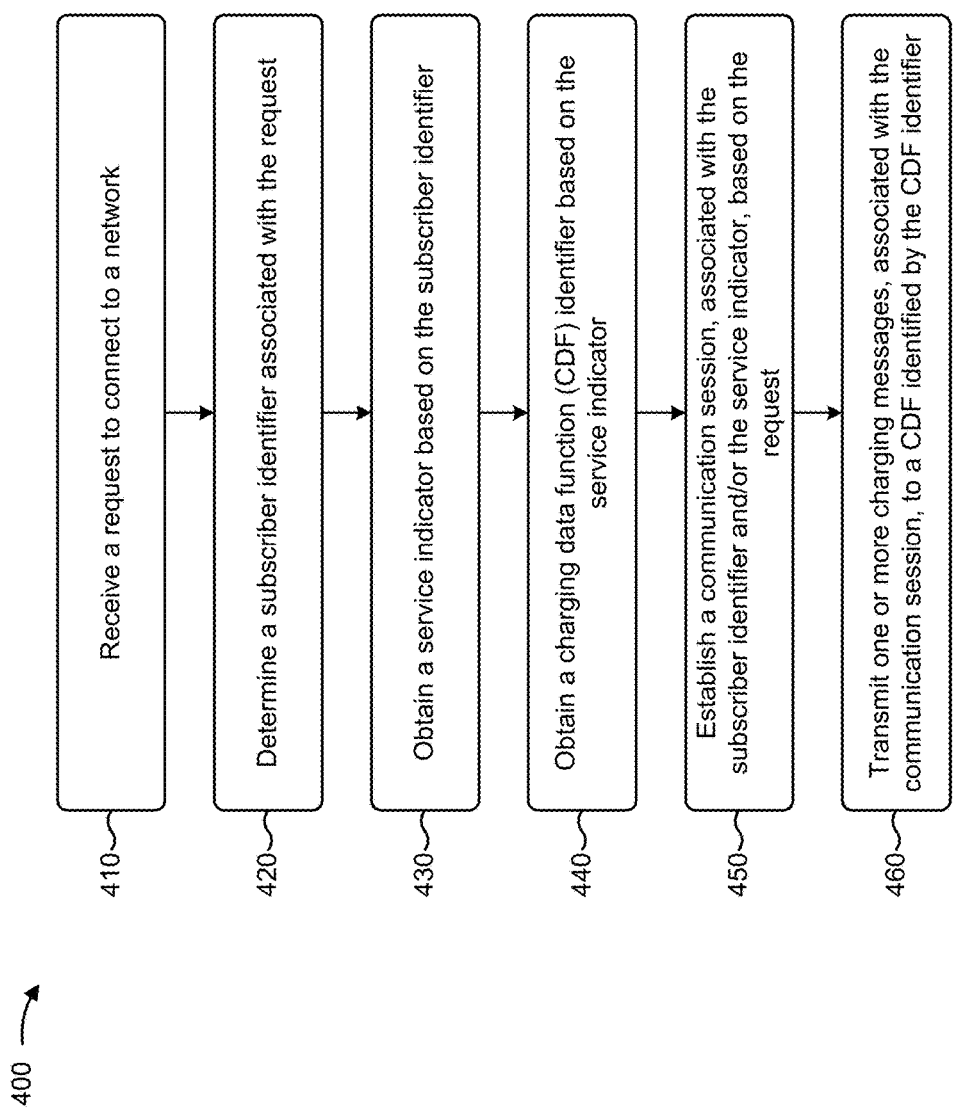
FIG. 4 is a flow chart of an example process for routing charging messages to different Charging Data Function (CDF) groups based on subscriber profile information and a set of rules associated with the charging messages.

FIG. 4 is a flow chart of an example process 400 for routing charging messages to different CDF groups based on subscriber profile information and a set of rules associated with the charging messages. In some implementations, one or more process blocks of FIG. 4 may be performed by PGW 225. In some implementations, one or more process blocks of FIG. 4 may be performed by another device or a group of devices separate from or including PGW 225, such as subscriber device 205, base station 210, SGW 220, HSS/AAA 230, PCRF 235, and/or CDF 240.

As shown in FIG. 4, process 400 may include receiving a request to connect to a network (block 410). For example, PGW 225 may receive a connection request from subscriber device 205 that includes connection request information. Connection request information may include a subscriber identifier (e.g., a unique identifier associated with subscriber device 205), a subscriber credential (e.g., a password associated with the subscriber identifier), or the like.

In some implementations, prior to receiving the connection request, one or more devices of environment 200 may be provisioned with subscriber policy information. For example, HSS/AAA 230 and/or PCRF 235 may be provisioned with subscriber policy information, such as a subscriber identifier, a service indicator (e.g., an indicator for a network service that a subscriber or subscriber device 205 is permitted to access), service destination information (e.g., a network service and/or subscriber may be assigned a CDF group as a destination), service charge information (e.g., a charge amount for certain data use, a trigger to start and/or end a charge period, etc.), or the like. Additionally, or alternatively, a subscriber database may be provisioned with the above subscriber policy information and may be accessible by HSS/AAA 230 and/or PCRF 235.

In some implementations, prior to PGW 225 receiving the connection request, PGW 225 may be provisioned with destination information. For example, PGW 225 may be provisioned with destination information, such as a destination identifier (e.g., CDF identifier(s) for CDF group(s) in CDF 240, such as an IP address or a collection of IP addresses for each CDF group), a transport protocol identifier (e.g., a radius protocol, a diameter protocol, etc.), or the like. As a result of the provisioning, PGW 225 may determine a subscriber identifier associated with the connection request, as described below.

As further shown in FIG. 4, process 400 may include determining a subscriber identifier associated with the request (block 420). For example, PGW 225 may examine packets associated with the connection request to locate a subscriber identifier included in the packets. The subscriber identifier may be a unique identifier (e.g., a string of characters) associated with a subscriber. In some implementations, PGW 225 may use the subscriber identifier to obtain one or more service indicators for one or more network services that a subscriber using subscriber device 205 may access, as described below.

As further shown in FIG. 4, process 400 may include obtaining a service indicator based on the subscriber identifier (block 430). For example, PGW 225 may obtain the service indicator by transmitting the subscriber identifier to HSS/AAA 230. A service indicator may include information that identifies a network service, such as an Access Point Name (APN), a network address (e.g., an IP address), a port identifier (e.g., a port number), a domain name, a protocol identifier, one or more IP pool groups, or the like.

In some implementations, after PGW 225 transmits the subscriber identifier to HSS/AAA 230, HSS/AAA 230 may use the subscriber identifier to search a data structure for the service indicator. For example, HSS/AAA 230 may use the subscriber identifier to search a data structure that pairs the subscriber identifier with a service indicator for each subscribed network service. As an example, if PGW 225 transmits a subscriber identifier to HSS/AAA 230 for a subscriber with a subscription to a network service (e.g., a particular application, a voice over LTE (VoLTE) service, a messaging service, etc.), HS S/AAA 230 may use the subscriber identifier to search a data structure to determine that the subscriber identifier is associated with the network service. HSS/AAA 230 may transmit the service indicator to PGW 225 so that PGW 225 may use the service indicator to request destination information from PCRF 235. In this way, use of a service indicator allows PGW 225 to provide faster and more flexible implementation of new services because each new network service may be automatically provisioned with a service indicator, and PGW 225 may use the service indicator to communicate with other network devices to ensure proper routing of charging messages.

As further shown in FIG. 4, process 400 may include obtaining a charging data function (CDF) identifier based on the service indicator (block 440). For example, PGW 225 may obtain a CDF identifier by transmitting the service indicator to PCRF 235. A CDF identifier may include information that identifies CDF 240 as a destination for charging messages relating to the network service and/or subscriber, such as a string of characters, a network address (e.g., an IP address), a port identifier, a group of network addresses, or the like.

In some implementations, after PGW 225 transmits the service indicator to PCRF 235, PCRF 235 may use the service indicator to search a data structure for the CDF identifier. For example, PCRF 235 may use the service indicator to search a data structure that pairs the service indicator with the CDF identifier. As an example, if PGW 225 transmits two service indicators to PCRF 235 (e.g., a first service indicator for a $10/month online streaming subscription and a second service indicator for a monthly data plan for other data usage), PCRF 235 may use the two service indicators to search a data structure to determine that the first network service (e.g., the $10/month online streaming subscription) is paired with a first CDF identifier, and the second network service (e.g., the monthly data plan for other data usage) is paired with a second CDF identifier. In this case, PGW 225 may receive the first CDF identifier and the second CDF identifier. As a result of the data gathered by PGW 225 (e.g., the subscriber identifier, the service indicator for network service(s), the CDF identifier for each network service, etc.), PGW 225 may appropriately route charging messages for a communication session, with subscriber device 205, that is associated with a particular network service. In this way, use of a CDF identifier allows PGW 225 to provide faster and more flexible implementation of new services because each new network service may be automatically provisioned with a CDF identifier, and PGW 225 may use the CDF identifier to communicate with other network devices to ensure proper routing of charging messages. Furthermore, by provisioning PCRF 235 with CDF identifiers for both new and existing services, PGW 225 is able to reduce errors and conserves network resources that would otherwise be wasted if PGW 225 were to route charging messages to an incorrect destination.

As shown in FIG. 4, process 400 may include establishing a communication session, associated with the subscriber identifier and/or the service indicator, based on the request (block 450). For example, PGW 225 may establish a communication session with subscriber device 205, which may cause charging events and/or charging messages to be generated in association with the communication session. A charging message may include information used to determine network resource usage for a particular service, such as the number of minutes the service was used (e.g., based on a start time and an end time during a given cycle), the amount of data used by the service (e.g., based on a byte counter that may run during a given cycle), or the like.

In some implementations, PGW 225 may receive (e.g., from a charging trigger function (CTF)) and/or generate charging messages for a service indicator associated with the communication session. For example, PGW 225 may establish a communication session to allow the CTF to generate charging messages for a service indicator and/or subscriber identifier associated with the communication session, to count a quantity of charging data (e.g., in bytes) used for each service indicator associated with the subscriber identifier, or the like. As an example, PGW 225 may establish a communication session with subscriber device 205, and the CTF may begin to generate charging messages for a network service that uses the communication session (e.g., for data usage for an application, for a VoLTE call, etc.). In this case, the CTF may generate charging messages for each network service during a data cycle (e.g., a period of a month) and PGW 225 may transmit charging messages for each network service to a CDF group identified by the CDF identifier.

As further shown in FIG. 4, process 400 may include transmitting one or more charging messages, associated with the communication session, to a CDF identified by the CDF identifier (block 460). For example, PGW 225 may transmit charging messages for a communication session, associated with a subscriber identifier and/or service indicator, to a CDF group in CDF 240 based on a CDF identifier associated with the subscriber identifier and/or service indicator.

In some implementations, PGW 225 may transmit charging messages to different CDF groups for a subscriber that has a subscription for different network services. For example, a charging message may include a subscriber identifier, a service indicator for a network service associated with a communication session for which the charging message is generated, a CDF identifier that identifies a destination for the charging message, charging data associated with the network service (e.g., a quantity of bytes used, a quantity of minutes used, etc.), or the like. As an example, network services may use different charging rules (e.g., a first network service may have a set charge to provide 1 Gb of data for streaming a specific online service, while a second network service may have an associated charge and provide the subscriber's ordinary data plan of 3 Gb of data). Here, when a subscriber uses the network service associated with a first service indicator for the first network service, the charging message for the first network service may be sent to a first CDF group identified by a first CDF identifier. In this example, charging messages for all other network services may be sent to a second CDF group identified by a second CDF identifier. As a result, the subscriber, with subscriptions for two separate network services, may now have charging messages intelligently routed by PGW 225 to multiple CDF groups in CDF 240. In this way, PGW 225 is able to provide faster and more flexible implementation of services because subscribed network services may be intelligently routed to unique locations based on the CDF identifier.

In some implementations, a CDF group may include a primary CDF group and a secondary CDF group. For example, PGW 225 may transmit charging messages for a network service to a CDF group that is configured with a primary CDF group and a secondary CDF group. Here, PGW 225 may be configured to transmit charging messages to the primary CDF group by default, and to only transmit charging messages to the secondary CDF group if transmission to the primary CDF group fails. In this way, PGW 225 may use intelligent routing to take advantage of backup servers that may be needed to keep accurate charge records, and to ensure data integrity.

In some implementations, PGW 225 may continue to transmit charging messages to different CDF groups when a new network service is added for an existing subscriber. For example, PGW 225 may transmit charging messages to CDF 240 (e.g., CDF group A) for an existing network service (e.g., service A, which may be identified using service indicator A) using a provisioned CDF identifier (e.g., CDF identifier A). When a new network service is created (e.g., service B), the new network service may be provisioned with a service indicator (e.g., service indicator B) and a CDF group (e.g., CDF group B) using a CDF identifier (e.g., CDF identifier B). Here, PGW 225 may transmit charging messages for the existing network service (e.g., service A) to the existing CDF group (e.g., CDF group A) and may transmit charging messages for the new network service (e.g., service B) to the new CDF group (e.g., CDF group B). In this way, PGW 225 is able to provide faster and more flexible implementation of new services because each new network service may be intelligently routed based on the CDF identifier.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

PGW 225 may provide intelligent routing that allows for faster and more efficient implementation of new network services, faster and more efficient handling of subscriptions to existing network services, and greater flexibility in creating or modifying network services. For example, prior to a subscriber request to connect to the network, HSS/AAA 230 and/or PCRF 235 may be automatically provisioned with information regarding network services (e.g., a service indicator, a CDF identifier, etc.), and PGW 225 may communicate with these devices to ensure proper routing of charging messages. This may reduce errors and conserve network resources that would otherwise be wasted if PGW 225 were to route charging messages to an incorrect destination. Furthermore, this may increase transaction accuracy by eliminating situations where a subscriber is improperly charged due to having a subscription routed to the incorrect destination.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A non-transitory computer-readable medium storing instructions, the instructions comprising:
   one or more instructions that, when executed by one or more processors, cause the one or more processors to:
   determine a subscriber identifier associated with a subscriber device;
   obtain a first service indicator and a second service indicator based on the subscriber identifier,
   the first service indicator identifying a first network service to which the subscriber device is subscribed,
   the second service indicator identifying a second network service to which the subscriber device is subscribed;
   obtain a first charging data function (CDF) identifier based on the first service indicator,
   the first CDF identifier identifying a first destination CDF to which first charging messages, associated with the first network service, are to be routed;
   obtain a second CDF identifier based on the second service indicator,
   the second CDF identifier identifying a second destination CDF to which second charging messages, associated with the second network service, are to be routed; and
   selectively route a charging message, associated with the subscriber device, to the first destination CDF or the second destination CDF based on whether the charging message is associated with the first network service or the second network service.

2. The non-transitory computer-readable medium of claim 1, where the one or more instructions, that cause the one or more processors to obtain the first service indicator and the second service indicator, cause the one or more processors to:
provide the subscriber identifier to a first device; and
receive the first service indicator and the second service indicator from the first device based on providing the subscriber identifier to the first device.

3. The non-transitory computer-readable medium of claim 2, where the one or more instructions, that cause the one or more processors to obtain the first CDF identifier, cause the one or more processors to:
provide the first service indicator to a second device; and
receive the first CDF identifier from the second device based on providing the first service indicator to the second device; and
where the one or more instructions, that cause the one or more processors to obtain the second CDF identifier, cause the one or more processors to:
provide the second service indicator to the second device; and
receive the second CDF identifier from the second device based on providing the second service indicator to the second device.

4. The non-transitory computer-readable medium of claim 1, where the charging message is an RE (radio frequency) message of a Diameter protocol.

5. The non-transitory computer-readable medium of claim 1, where the one or more instructions, when executed by the one or more processors, cause the one or more processors to:
receive, from the subscriber device, a request to establish a communication session for the first network service;
establish the communication session for the first network service based on the request; and
where the one or more instructions, that cause the one or more processors to selectively route the charging message, cause the one or more processors to:
route the charging message, for the communication session, to the first destination CDT based on establishing the communication session for the first network service.

6. The non-transitory computer-readable medium of claim 1, where the first service indicator includes a first access point name (APN); and where the second service indicator includes a second APN.

7. A method, comprising:
receiving, by a device, a subscriber identifier associated with a subscriber device;
obtaining, by the device, a first service indicator and a second service indicator using the subscriber identifier,
the first service indicator identifying a first network service to which the subscriber device is subscribed,
the second service indicator identifying a second network service to which the subscriber device is subscribed;
obtaining, by the device, a first charging data function (CDF) identifier using the first service indicator,
the first CDF identifier identifying a first CDF device to which first charging messages, associated with the first network service, are to be routed;
obtaining, by the device, a second CDF identifier using the second service indicator,
the second CDF identifier identifying a second CDF device to which second charging messages, associated with the second network service, are to be routed;
determining, by the device, whether a charging message, associated with the subscriber identifier, is associated with the first network service or the second network service; and
selectively routing, by the device, the charging message to the first CDF device or the second CDF device based on determining whether the charging message is associated with the first network service or the second network service.

8. The method of claim 7, where receiving the first service indicator and the second service indicator comprises:
providing the subscriber identifier to a first device; and
receiving the first service indicator and the second service indicator from the first device based on providing the subscriber identifier to the first device.

9. The method of claim 8, where the first device is a home subscriber server or an authentication, authorization, and accounting server.

10. The method of claim 7, where obtaining the first CDF identifier comprises:
providing the first service indicator to a second device; and
receiving the first CDF identifier from the second device based on providing the first service indicator to the second device; and
where obtaining the second CDF identifier comprises:
providing the second service indicator to the second device; and
receiving the second CDF identifier from the second device based on providing the second service indicator to the second device.

11. The method of claim 10, where the second device is a policy charging and rules function server.

12. The method of claim 7, where the device is a packet data network gateway.

13. The method of claim 7, where the charging message is associated with a Radius protocol or a Diameter protocol.

14. A device, comprising:
one or more memories; and
one or more processors, communicatively coupled to the one or more memories, to:
determine a subscriber identifier associated with a subscriber device;
obtain a first service indicator and a second service indicator based on the subscriber identifier,
the first service indicator identifying a first network service to which the subscriber device is subscribed,
the second service indicator identifying a second network service to which the subscriber device is subscribed:
obtain a first charging data function (CDF) identifier based on the first service indicator,
the first CDF identifier identifying a first destination CDF to which first charging messages, associated with the first network service, are to be routed;
obtain a second CDF identifier based on the second service indicator,
the second CDF identifier identifying a second destination CDF to which second charging messages, associated with the second network service, are to be routed; and selectively route a charging message, associated with the subscriber device, to the first destination CDF or the second destination CDF based on whether the charging message is associated with the first network service or the second network service.

15. The device of claim 14, where the one or more processors are further to:
provide the subscriber identifier to a first device; and
receive the first service indicator and the second service indicator from the first device based on providing the subscriber identifier to the first device.

16. The device of claim 15, where the one or more processors are further to:
provide the first service indicator to a second device;
where the one or more processors, when obtaining the first CDF identifier, are to:
receive the first CDF identifier from the second device based on providing the first service indicator to the second device;
where the one or more processors are further to:
provide the second service indicator to the second device; and
where the one or more processors, when obtaining the second CDF identifier, are to:
receive the second CDF identifier from the second device based on providing the second service indicator to the second device.

17. The device of claim 14, where the charging message is an Rf (radio frequency) message of a Diameter protocol.

18. The device of claim 14, where the one or more processors are further to:
receive, from the subscriber device, a request to establish a communication session for the first network service;
establish the communication session for the first network service based on the request; and
where the one or more processors, when selectively routing the charging message, are to:
route the charging message, for the communication session, to the first destination CDF based on establishing the communication session for the first network service.

19. The device of claim 14, where the first service indicator includes a first access point name (APN); and
where the second service indicator includes a second APN.

20. The device of claim 15, where the first device is a home subscriber server or an authentication, authorization, and accounting server.

* * * * *